United States Patent [19]
Utsumi et al.

[11] Patent Number: 4,985,537
[45] Date of Patent: Jan. 15, 1991

[54] PROCESS OF MAKING A BIAXIALLY STRETCHED POLYESTER FILM AND BIAXIALLY STRETCHED POLYESTER FILM

[75] Inventors: Shigeo Utsumi, Yokohama; Tomoyuki Kotani, Machida; Kichinojo Tomitaka, Yokohama, all of Japan

[73] Assignee: Diafoil Company, Limited, Tokyo, Japan

[21] Appl. No.: 337,842

[22] Filed: Apr. 13, 1989

[30] Foreign Application Priority Data

Apr. 19, 1988 [JP] Japan .................... 63-96145

[51] Int. Cl.$^5$ ............... B29C 55/12; C08G 63/02
[52] U.S. Cl. ............... 528/272; 264/235.8; 264/342 RE; 428/910; 525/437; 525/444; 528/298; 528/308.2
[58] Field of Search ............ 264/210.7, 235.8, 290.2, 264/342 RE; 428/480, 910; 525/437, 444; 528/272, 298, 308.2

[56] References Cited

U.S. PATENT DOCUMENTS

| | | | |
|---|---|---|---|
| 2,779,684 | 1/1957 | Alles | 264/235.8 X |
| 2,928,132 | 3/1960 | Richards, Jr. | 264/235.8 |
| 2,968,067 | 1/1961 | Long | 264/235.8 X |
| 3,875,119 | 4/1975 | Aoki et al. | 264/235.8 X |
| 3,903,294 | 9/1975 | Abella | 264/235.8 |
| 4,275,107 | 6/1981 | Bartkus et al. | 428/480 X |
| 4,497,865 | 2/1985 | Minami et al. | 428/480 X |
| 4,677,188 | 6/1987 | Utsumi et al. | 528/272 |

FOREIGN PATENT DOCUMENTS 62-134244 6/1987 Japan ................ 264/342 RE

OTHER PUBLICATIONS

English-Language Translation of Japanese Reference (Kokai) 62-134,244.

Primary Examiner—Jeffery Thurlow
Assistant Examiner—Leo B. Tentoni
Attorney, Agent, or Firm—Oblon, Spivak, McClelland, Maier & Neustadt

[57] ABSTRACT

A biaxially stretched polyester film which satisfies the following equations (1) to (4):

$$0.155 \leq \Delta P \leq 0.180 \quad (1)$$

$$1.6050 \leq \bar{n} \leq 1.6085 \quad (2)$$

$$\bar{n} \geq 1.622 - (0.1 \times \Delta P) \quad (3)$$

$$\alpha MD + TD \leq 3.0 \quad (4)$$

wherein $\Delta P$, $\bar{n}$ and $\alpha MD + TD$ respectively respect the degree of surface orientation, the average refractive index and the sum (%) of the shrinkage in the machine and transverse directions after the film is subjected to heat treatment at 105° C. for 30 minutes. The film is not easily curled even if one side thereof is treated with a solvent, and is thus suitable for use involving a step of dipping one surface of a film in a solvent, such as solvent development-type photo resist film and base films for magnetic recording media.

2 Claims, No Drawings

PROCESS OF MAKING A BIAXIALLY STRETCHED POLYESTER FILM AND BIAXIALLY STRETCHED POLYESTER FILM

BACKGROUND OF THE INVENTION:

The present invention relates to a biaxially stretched polyester film exhibiting a low degree of curling, and particularly to a biaxially stretched polyester film which exhibits a very low degree of curling when one side thereof is dipped in a solvent.

Since biaxially stretched polyester films exhibit excellent heat resistance, mechanical properties, chemical resistance and so on, they are used in a wide range of applications and the demand for such films increases year by year.

Although such films have excellent characteristics, if one side thereof is dipped in a solvent and then dried, curls occur. This curling in some cases leads to restrictions in use, depending upon the use concerned. For example, in a process of removing a polyester layer from a photosensitive layer of a solvent development-type photo resist film by treatment with methylene chloride before development, the film curls toward the photosensitive layer side. A high degree of curling interferes with development in some cases and is thus a very critical problem.

When polyester films are used as the base films of magnetic recording media, an undercoating is provided, if required, on the polyester films by using p-chlorophenol or the like as a solvent. In this case, there is a problem that one side of the polyester film becomes swollen and thus becomes curled.

As described above, polyester films are treated with a solvent more and more frequently in various applications thereof, and there is thus a great demand for development of a polyester film which is capable of coping with this.

As a result of the research conducted by the present inventors in consideration of the above-described problem, the present inventors have found that a polyester film having particular physical properties has resistance to curling. The present invention has accomplished based on this finding.

SUMMARY OF THE INVENTION:

In a first aspect of the present invention, there is provided a biaxially stretched polyester film which satisfies simultaneously the following equations (1) to (4):

$$0.155 \leq \Delta P \leq 0.180 \quad (1)$$

$$1.6050 \leq \bar{n} \leq 1.6085 \quad (2)$$

$$\bar{n} \geq 1.622 - (0.1 \times \Delta P) \quad (3)$$

$$\alpha MD + TD \leq 3.0 \quad (4)$$

wherein $\Delta P$, $\bar{n}$ and $\alpha MD + TD$ respectively represent the degree of surface orientation of the film, the average refractive index of the film and the sum (%) of the shrinkage in the machine (longitudinal) and transverse directions of the film after heat treatment at 105° C. for 30 minutes.

In a second aspect of the present invention, there is provided a process for producing the biaxially stretched polyester film as defined above.

DETAILED DESCRIPTION OF THE INVENTION:

The polyester used in the present invention is a crystalline aromatic polyester which can be obtained by polycondensation of an aromatic dicarboxylic acid such as terephthalic acid, isophthalic acid or naphthalene-2,6-dicarboxylic acid or an ester thereof and a diol such as ethylene glycol, diethylene glycol, tetramethylene glycol or neopentyl glycol. Such a polyester can be obtained by a method employing direct polycondensation of an aromatic dicarboxylic acid and glycol, a method employing ester interchange reaction between a dialkyl ester of an aromatic dicarboxylic acid and glycol and subsequent polycondensation, or a method employing polycondensation of diglycol ester of an aromatic dicarboxylic acid.

Typical examples of such polyesters include polyethylene terephthalate, polyethylene-2,6-naphthalate, polytetramethylene terephthalate, polytetramethylene-2,6-naphthalate and the like. For example, a homopolyester such as polyethylene terephthalate or polyethylene-2,6-naphthalate in which terephthalic acid or naphthalene-2,6-dicarboxylic acid is polycondensed with ethylene glycol, a copolyester comprising 80 mol % or more of ethylene terephthalate unit or ethylene-2,6-naphthalate unit and 20 mol % or less of other constitutional repeating unit, or a mixed polyester comprising one of these polyesters and other polymers added thereto can be used as the material for the polyester film in the present invention.

In the present invention, if the degree of polymerization of the polyester used is too low, the mechanical characteristics will be poor. Therefore, the intrinsic viscosity of the polyester used is preferably 0.4 or more, more preferably 0.50 to 0.90, further preferably 0.55 to 0.85.

Fine particles may be contained in the polyester for the purpose of imparting slipping properties thereto. Examples of fine particles that are suitable for imparting slipping properties include internally deposited particles which are formed from the residue of a catalyst during polymerization, and known inactive external additive particles such as kaolin, clay, calcium carbonate, silicon oxide and the like.

These particles can be added to the polyester by a known method in such an amount that the object of the present invention is not impaired.

Although a biaxially stretched polyester film can be produced using the polyester described above, it is necessary that the physical properties of the biaxially stretched polyester film, i.e., the degree of surface orientation ($\Delta P$), average refractive index ($\bar{n}$) and the sum ($\alpha MD + TD$ (%)) of the shrinkage in the machine and transverse directions of the biaxially stretched polyester film after heat treatment at 105° C. for 30 minutes, should be controlled within specific ranges.

The $\Delta P$ value of the film of the present invention should be within the range of 0.155 to 0.180 and should simultaneously be $16.22 - 10 \cdot \bar{n}$ or more, preferably 0.160 to 0.180, more preferably 0.160 to 0.175. If the $\Delta P$ value is below $16.22 - 10 \times \bar{n}$ or below 0.155, the amorphous portion of the film has a low degree of orientation and will hence allow a solvent to readily permeate into the film, resulting in an increase in the degree of curling. On the other hand, if the $\Delta P$ value is over 0.180, the film exhibits an increased shrinkage and is thus unable to be used in practice.

The $\bar{n}$ value of the film of the present invention should be within the range of 1.6050 to 1.6085 and should simultaneously be $1.622 - (0.1 \times \Delta P)$ or more, preferably 1.6065 to 1.6085, more preferably 1.6065 to 1.6080. If the $\bar{n}$ value is less than 1.6050 or less than $(1.622 - 0.1 \times \Delta P)$, the amount of the amorphous portion of the film is increased and this allow a solvent to readily permeate into the film, resulting in a tendency to undergo curling. On the other hand, if the $\bar{n}$ value is over 1.6085, the strength of the film is undesirably reduced.

In addition to the above-described conditions, the film of the present invention should satisfy the condition that the sum of the shrinkage ($\alpha$MD+TD) is 3.0% or less, preferably 2.5% or less, more preferably 2.0% or less. If the $\alpha$MD+TD value is over 3.0%, the degree of curling will increase even if the values of $\Delta P$ and $\bar{n}$ are within the ranges of the present invention.

The intrinsic viscosity ([$\eta$]) of the film of the present invention is preferably 0.55 to 0.75, more preferably 0.60 to 0.70.

If the intrinsic viscosity [$\eta$] of the film is lower than 0.55, differences will readily occur in the degrees of crystallinity on the face and rear sides of the film when one side of the polyester film is dipped in a solvent, and thus curling will readily occur. If the intrinsic viscosity [$\eta$] of the film is over 0.75, the degree of crystallinity of the film is not easily increased, and a polyester film having such an intrinsic viscosity is unsuitable.

A reason that the film of the present invention has resistance to curling is regarded, for example, as follows.

If solvent molecules permeate into the molecular chains of a polyester, the amorphous portion of the film is in some cases crystallized and this causes shrinkage of the film which generates curling. As the present invention shows, it is possible to decrease the degree of film shrinkage and the degree of curling by reducing the amorphous portion by way of increasing the crystallinity of the polyester film so as to increase the degree of orientation of the amorphous portion, as well as preventing the solvent molecules from readily entering into the polyester molecular chains.

The inventors found that, although the $\Delta P$ value should be increased for the purpose of increasing the degree of orientation, any increase in the $\Delta P$ value causes a relative increase in shrinkage and thus the particular relation between these values is important for a good resistance to curling of a polyester film.

The method of producing the film of the present invention is described in detail below.

The polyester is extruded into a sheet form using an extruder at a temperature within the range of 280° to 320° C. and then cooled to a temperature of about 70° C. or lower to form a substantially amorphous sheet. The thus-formed sheet is then stretched 10 to 25 times, preferably 11 to 16 times the initial area in the machine (longitudinal) and transverse directions at a temperature of 75° to 130° C., preferably 75° to 115° C. to form a biaxially stretched polyester film. The respective stretching ratios are 3.0 to 5.0 times, preferably 3.3 to 4.5 times the initial length in the machine direction and 3.0 to 5.0 times, preferably 3.3 to 4.5 times the initial length in the transverse direction. The thus-formed polyester film is subjected to heat treatment at a temperature of 230° to 250° C. for 1 to 60 sec.

The polyester film is then subjected to transverse relaxation to an extent of 3 to 10% in the transverse direction during the above-described heat treatment or a cooling step at 150° to 230° C. subsequent to the heat treatment. Then subjected to longitudinal relaxation to an extent of 0 to 10% in the machine direction at 60° to 220° C. before winding up, thereby forming the film of the present invention.

Particularly, in order to increase the degree of surface orientation, machine re-stretching and/or transverse re-stretching and multi-stage machine stretching can be appropriately employed, as occasion demands. The machine re-stretching is carried out by stretching in the machine direction 1.01 to 1.50 times the length before stretching at a temperature of 95° to 150° C. and the transverse re-stretching is carried out by stretching in the transverse direction 1.01 to 1.50 times the length before stretching at a temperature of 100° to 150° C. The multi-stage machine stretching is carried out as follows. First, the stretching is performed 2.0 to 3.5 times the length before stretching at a temperature of 80° to 120° C. Subsequently, further stretching is performed once or more times at a temperature of 75° to 115° C. at a respective stretching ratio of 1.1 to 2.5 times the length before stretching. In the case of employing the machine- or transverse re-stretching, or the multi-stage machine stretching, it is preferable to perform machine relaxation and/or transverse relaxation in order to achieve a low shrinkage in the same manner as described above.

The film of the present invention can be obtained by selecting appropriate conditions from the above-described ranges, and the thickness thereof is generally 5 to 100 μm, preferably 7 to 50 μm.

The present invention is described in detail below with reference to examples, but the present invention is not limited to these examples.

The methods of evaluating the film were as follows.

(1) Evaluation of the resistance to curling of a film when one side of the film was dipped in methylene chloride:

A strip of the film to be evaluated having a length of 150 mm and a width of 200 mm was placed in a vessel filled with methylene chloride so that one side thereof was dipped therein, and was then allowed to stand at room temperature for 60 seconds. The film was then dried at room temperature and allowed to stand for 20 hours. The degree of curling of the film in the machine or transverse direction on the side which was immersed in methylene chloride was observed with the naked eye, and the resistance to curling was evaluated using the following ranks:

Rank: ⊙ (Very good)
Rank: ○ (Good)
Rank: Δ (Slightly poor)
Rank: x (Poor)

(2) Evaluation of the resistance to curling of a film when one side of the film was immersed in p-chlorophenol:

The resistance to curling was evaluated in the same way as that employed in (1) with the exception that p-chlorophenol was used in place of methylene chloride. (3) Degree of surface orientation and average refractive index:

The refractive index of the film was measured by using an Abbe's refractometer produced by Atago Co., Ltd. and using a sodium lamp as a light source.

The maximum refractive index (n$\gamma$) of the film surface, the refractive index (n$\beta$) in the direction on the film surface vertical to the direction of the maximum refractive index and the refractive index ($n\alpha$) in the direction of the thickness were measured, and the degree of surface orientation and average refractive index were calculated using the following equations.

Degree of surface orientation $\Delta P = (n\gamma + n\beta)/2 - n\alpha$

Average refractive index $\bar{n} = (n\alpha + n\beta + n\gamma)/3$ (4) Intrinsic viscosity [$\eta$]

1 g of the polymer or the film was dissolved in 100 ml of a solvent mixture of phenol and tetrachloroethane (50/50 by weight) and the viscosity was then measured at 30° C. using a falling-type viscometer.

(5) Shrinkage

Each of samples collected by cutting the film into strips having a width of 1 cm in the machine and transverse directions was subjected to heat treatment at 105° C. for 30 minutes. The shrinkage (%) of each of the samples was determined, and the sum $^\alpha MD+TD$ (%) of the shrinkage in the machine and transverse directions was calculated.

EXAMPLE 1

Polyethylene terephthalate resin which was so prepared as to contain 60 ppm of $SiO_2$ particles with a size of 1.3 μm and 120 ppm of $SiO_2$ particles with a primary size of 30 μm was dried by a usual method. The dried resin was then melt-extruded at 280° C. and solidified by cooling on a casting drum at 40° C. using an electrostatic cooling method to form an amorphous sheet.

The thus-obtained amorphous sheet was then stretched 3.9 times at 85° C. in the machine direction and stretched 3.8 times at 95° C. in the transverse direction, and then subjected to transverse relaxation to the extent of 10% during heat-setting at 244° C. After heat-setting, the sheet was subjected to longitudinal relaxation to the extent of 3% at about 130° C. during cooling to form a film with a thickness of 25 μm which was then wound up.

COMPARATIVE EXAMPLE 1

An amorphous sheet obtained in the same way as in Example 1 was stretched 3.8 times at 85° C. in the machine direction and 3.7 times at 95° C. in the transverse direction, and then heat-set at 242° C. to obtain a film with a thickness of 25 μm.

COMPARATIVE EXAMPLE 2

An amorphous sheet obtained in the same way as in Example 1 was stretched 3.0 times at 85° C. in the machine direction and 3.8 times at 95° C. in the transverse direction, and then heat-set at 245° C. to obtain a film with a thickness of 25 μm.

COMPARATIVE EXAMPLE 3

An amorphous sheet obtained in the same way as in Example 1 was stretched 3.9 times at 85° C. in the machine direction and 3.8 times at 95° C. in the transverse direction, and then heat-set at 255° C. to obtain a film with a thickness of 25 μm. The thus-obtained film had a low degree of strength and was easily broken.

COMPARATIVE EXAMPLE 4

An amorphous sheet obtained in the same way as in Example 1 was stretched 3.7 times at 85° C. in the machine direction and 3.8 times at 95° C. in the transverse direction and then heat-set at 225° C. to obtain a film with a thickness of 25 μm. EXAMPLE 2

The amorphous sheet obtained in the same way as that employed in Example 1 was stretched 3.0 times at 83° C. and then further stretched 1.5 times at 78° C. in the machine direction and then stretched 3.9 times at 110° C. in the transverse direction using a tenter. After the sheet was again stretched 1.08 times at 120° C. in the machine direction, it was heat-set at 242° C. The heat-set sheet was then subjected to relaxation in the machine and transverse directions during a cooling process to obtain a film with a thickness of 15 μm.

COMPARATIVE EXAMPLE 5

A film was obtained by the same method as that employed in Example 2 with the exception that the temperature of heat-setting was 228° C.

The physical properties and characteristics of the films obtained are shown in Table 1.

TABLE 1

| | Degree of surface orientation $\Delta P$ | Average refractive index $\bar{n}$ | Shrinkage $^\alpha MD + TD$(%) | Evaluation of resistance to curling (Rank) (1)*1 | (2)*2 |
|---|---|---|---|---|---|
| Example 1 | 0.163 | 1.6067 | 1.0 | ○-◉ | — |
| Comparative Example 1 | 0.165 | 1.6062 | 3.8 | △ | — |
| Comparative Example 2 | 0.150 | 1.6067 | 1.0 | x | — |
| Comparative Example 3 | 0.163 | 1.6090 | 0.8 | — | — |
| Comparative Example 4 | 0.163 | 1.6045 | 1.5 | x | — |
| Example 2 | 0.173 | 1.6060 | 2.1 | — | ○-◉ |
| Comparative Example 5 | 0.175 | 1.6048 | 2.5 | — | x |

*1: Methylene chloride was used.
*2: Parachlorophenol was used.

What is claimed is:

1. A biaxially stretched polyester film for a solvent development-type photo resist film by treatment with methylene chloride, which simultaneously satisfies the following equations (1) to (4):

$$[0.155]0.160 \leq \Delta P \leq 0.180 \quad (1)$$

$$1.6050 \leq \bar{n} \leq 1.60085 \quad (2)$$

$$\bar{n} \geq 1.622 - (0.1 \times \Delta P) \quad (3)$$

$$^\alpha MD + TD \leq 2.0 [3.0] \quad (4)$$

wherein $\Delta P$, $\bar{n}$ and $^\alpha MD + TD$ respectively represent the degree of surface orientation, the average refractive index and the sum (%) of the shrinkage in the machine and transverse directions after said film is subjected to heat treatment at 105° C. for 30 minutes.

2. A process for producing a biaxially stretched polyester film for a solvent development-type photo resist film by treatment with methylene chloride simultaneously satisfying the following equations (1) to (4):

$$[0.155]0.160 \leq \Delta P \leq 0.180 \quad (1)$$

$$1.6050 \leq \bar{n} \leq 1.6085 \quad (2)$$

$$\bar{n} \geq 1.622 - (0.1 \times \Delta P) \quad (3)$$

$$\alpha MD \times TD \leq 2.0[3.0] \quad (4)$$

wherein $\Delta P$, $\bar{n}$ and $^\alpha MD + TD$ respectively represent the degree of surface orientation, the average refractive index and the sum (%) of the shrinkage in the machine and transverse directions after said film is subjected to heat treatment at 105° C. for 30 minutes, which comprises the steps of extruding a polyester into a sheet form having an initial area at 280° to 320° C. and cooling said sheet to a temperature of 70° C. or lower to form a substantially amorphous sheet; stretching said amorphous sheet 10 to 25 times the initial area at 75° to 130° C. in the machine and transverse directions; heat-treating the stretched film at a temperature of 230° to 250° C. for 1 to 60 sec; and relaxing to an extent of 3 to 10% in the transverse direction during said heat treatment at 230° to 250° C. or during a cooling step at 150° C. to 230° C. after said heat treatment and relaxing to an extent of 0 to 10% at 60° to 220° C. in the machine direction.

* * * * *

UNITED STATES PATENT AND TRADEMARK OFFICE
CERTIFICATE OF CORRECTION

PATENT NO. : 4,985,537
DATED : January 15, 1991
INVENTOR(S) : SHIGEO UTSUMI ET AL It is certified that error appears in the above-identified patent and that said Letters Patent is hereby corrected as shown below:

Column 6, line 39;
  In Claim 1, formula (1), delete [0.155], and in formula (2), "1.60085" should read --1.6085--, and in formula (4), delete [3.0].
Column 6, line 55;
  In Claim 2, formula 1, delete [0.155], and in formula (4), delete [3.0].

Signed and Sealed this

Thirteenth Day of October, 1992

*Attest:*

DOUGLAS B. COMER

*Attesting Officer*  *Acting Commissioner of Patents and Trademarks*